United States Patent Office 3,501,443
Patented Mar. 17, 1970

3,501,443
PROCESS FOR PREPARING A POLYIMIDE COMPRISING REACTING 3,4 - DICARBOXY - 1,2,3,4-TETRAHYDRO - 1 - NAPHTHALENE SUCCINIC DIANHYDRIDE WITH A DIPRIMARY DIAMINE IN THE PRESENCE OF CERTAIN ORGANIC SOLVENTS
Roland Ralph Di Leone, Rowayton, Conn., assignor to American Cyanamid Company, Stamford, Conn., a corporation of Maine
No Drawing. Filed May 20, 1968, Ser. No. 730,635
Int. Cl. C08g 20/32
U.S. Cl. 260—78   7 Claims

ABSTRACT OF THE DISCLOSURE

A process for preparing a polyimide comprising reacting a 3,4-dicarboxy-1,2,3,4-tetrahydro-1-naphthalene succinic dianhydride with a diprimary diamine in the presence of a solvent selected from the group consisting of acetophenone, cyclohexanone, isopharone, propiophenone and benzophenone until substantially all of the theoretical water of imidization has been removed.

CROSS REFERENCES TO RELATED APPLICATIONS

This application is related to the applicant's pending application Ser. No. 575,240, filed Aug. 26, 1966 now U.S. Patent No. 3,410,876 in that said case shows the preparation of 3,4 - dicarboxy - 1,2,3,4-tetrahydro-1-naphthalene succinic dianhydride. This application is also related to the instant applicant's copending application Ser. No. 589,521 filed Oct. 26, 1966 in that said application is directed to the polyimides of 3,4-dicarboxy-1,2,3,4-tetrahydro-1-naphthalene succinic dianhydride and a diprimary diamine. Both of the aforementioned copending applications are incorporated herein by reference.

BACKGROUND OF THE INVENTION

Polyimides have been prepared according to the prior art by reacting one or more dianhydrides of tetracarboxylic acids with a diprimary diamine. These polyimides have been prepared by reacting the essential ingredients in bulk and in organic solvents. However, certain organic solvents which have been used in the past have proven to be solvents for the essential reactants but have proven to be non-solvents for the polyimides and even for some of the intermediate reaction products developed by preliminary reaction by the dianhydrides with the diamines before the polyimides have been completely formed. The result has been that the polyimide intermediate reaction product precipitates out of the solvent which has then become a non-solvent and further reaction to form the polyimide completely is prevented resulting in the preparation of low molecular weight materials of diminished value and utility.

FIELD OF THE INVENTION

This invention is in the field of processing a dianhydride of a tetracarboxylic acid and a diprimary diamine in certain organic solvents, which solvents not only will dissolve the initial reactants but prove to be solvents for the polyimides and their intermediate reaction products leading up to said polyimides so that the intermediate reactants are not precipitated out of solution in the course of the imidization reaction nor is the ultimately, finally completed polyimide completely insoluble and it too remains in solution.

DESCRIPTION OF THE PRIOR ART

The instant applicant is not aware of any truly pertinent prior art that is deemed to be anticipatory of the concept of the present invention.

SUMMARY OF THE INVENTION

This invention relates to a process for preparing a polyimide comprising reacting a 3,4-dicarboxy-1,2,3,4-tetrahydro-1-naphthalene succinic dianhydride with a diprimary diamine in the presence of a solvent selected from the group consisting of acetophenone, cyclohexanone, isopharone, propiophenone and benzophenone until substantially all of the theoretical water of imidization has been removed. If the polyimides prepared according to the process of the present invention are to be used as coating compositions, such a coating is completely prepared when the imidization reaction is complete as indicated by the removal of substantially all of the theoretical water of imidization from the solution. At that point the polyimide is already dissolved in the solvent selected as the reaction medium and such a solution can be used to coat appropriate substrates such as wood, glass, metal, and the like; and upon heating the films thus deposited on the substrates at a temperature high enough to evaporate the solvent, the film of the polyimide alone is left remaining on the substrate. On the other hand if the polyimides prepared according to the present invention are to be used as molding compounds, the selected solvent is removed after all of the theoretical water of imidization has been removed by any conventional technique such as vacuum distillation, precipitation in a non-solvent devolatilization-extrusion, and the like. The resultant neat polyimide being a thermoplastic material may be chopped up into granules of any selected size so as to be useful as a molding composition.

Other solvents such as acetone, methyl ethyl ketone and ethyl acetate, while solvents for the monomers are not solvents for the polymer. As a result they do not permit the synthesis of high molecular weight polymer nor do they allow the imidization to go to completion. Other solvents such as dimethyl formamide, dimethyl acetamide, dimethyl sulfoxide, pyridine and the like, while solvents for both the monomers and polymers, do not permit one to achieve high molecular weight completely imidized polyimide. The reason is that these solvents are not totally inert in that they do dissolve the water of imidization. In turn the generated water causes hydrolysis of the polymer thus limiting the extent of polymerization and imidization. 100% solids reaction is not practical because the polymer that results has a melt temperature in excess of 300° C. At this temperature thermal and oxidation degradation would be a serious problem. In addition the melt viscosity would be extremely high necessitating extremely heavy duty equipment.

In the practice of the process of the present invention one may utilize a 3,4-dicarboxy-1,2,3,4-tetrahydro-1-naphthalene succinic dianhydride which is referred to hereinbelow as tetralin dianhydride for simplicity and sometimes as TDA for brevity. These dianhydrides will be referred to as TDA per se when the actual compound 3,4-dicarboxy-1,2,3,4-tetrahydro - 1 - naphthalene succinic dianhydride is used and as alkyl substituted TDA when the TDA is substituted in the 6 or 7 position with an alkyl group containing from 1 to 7 carbon atoms. It is preferred that a TDA be used as the sole dianhydride in reaction with the diprimary diamine to produce the most desirable polyimides of the present invention. However, other dianhydrides may be used with the TDA in co-reaction with the diprimary diamine but there should be at least 10 mol percent of the TDA present based on the total mols of dianhydrides used to prepare the polyimides. Among the other non-TDA dianhydrides which may be used in the practice of the process of the present invention are the following:

pyromellitic dianhydride;
2,3,6,7-naphthalene tetracarboxylic dianhydride;
3,3',4,4'-diphenyl tetracarboxylic dianhydride;

1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
1,2,3,4-butane tetracarboxylic dianhydride;
thiophene-2,3,4,5-tetracarboxylic dianhydride;
and the like and mixtures thereof.

The second essential component used in the process of the present invention is a diprimary diamine having the srtuctural formula:

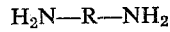

in which R is a divalent organic radical. Among the specific diprimary diamines which may be used in the practice of the process of the present invention are:
meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino naphthalene;
3,3'-dimethyl-4,4'-diamino-biphenyl;
3,3'-dimethoxy benzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4'-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;
and mixtures thereof.

In reacting the TDA with the diprimary diamine whether alone or in admixture with other dianhydrides or other diprimary diamines the total number of mols of the dianhydride should be substantially the same as the total number of mols of the diprimary diamine. In other words, the dianhydrides and the diamines are used on a 1:1 mol basis. Slight departures from this mol ratio can be utilized by using a slight excess such as about 5-10 mol percent of either the dianhydride or the diamine.

The process of the present invention is carried out in the presence of a solvent selected from the group consisting of acetophenone, cyclohexanone, isophorone, propiophenone and benzophenone. These solvents can be used either singly or in combination with one another but preferably singly as recovery of the solvent for reuse is thereby simplified. The amount of solvent used in carrying out the process of the present invention may be between about 30% and 99% by weight of solvent based on the total weight of said solution. Preferably depending on the ultimate use of product, one would use between about 30% and 70%.

In order that the concept of the present invention may be more completely understood, the following examples are set forth in which all parts are parts by weight unless otherwise indicated. These examples are set fourth primarily for the purpose of illustration.

Example 1

Into a suitable reaction vessel (a Sigma mixer) there is introduced 1562 parts of 3,4-dicarboxy-1,2,3,4-tetrahydro-1-naphthalene succinic dianhydride, 1410 parts of acetophenone, 1030 parts of 4,4'-diaminophenyl methane (a 65% solids solution). With constant agitation the mixture is heated until it reaches a maximum temperature of 165° C. Water, which is the byproduct of the imidization, starts distilling over at 120° C. When all of the theoretical water has been distilled off, the temperature reaches the maximum of about 165° C. The total reaction time is about two hours. The polyimide thus produced can be isolated by devolatilization and extrusion if desired.

The above synthesis can be carried out at other concentration levels from about 1% to about 70% solids although it could be accomplished at higher solids if the necessary heavy duty equipment were available. The upper limitation on the high solids side is dictated by the viscosity of the solution alone and if the equipment were available one could conduct the process at a solids content of 80% or even 90%, if desired.

In addition to isolating the polymer by devolatilization and extrusion, it is additionally possible to isolate the polymer by precipitation using a non-solvent such as acetone or ethyl acetate to accomplish the precipitation. These non-solvents are compatible with the solvents used in the system but are not solvents for the polyimide. Therefore, if desired one can add the non-solvents to the solution in small increments with constant stirring until the first permanent milkiness is found in the dispersion whereupon a substantial additional amount of the non-solvent is immediately introduced which causes the polyimide to precipitate out of solution as fine discrete particles. Preferably one would introduce the polyimide solution into the non-solvent in one step and thereby precipitate the polymer suddenly.

Example 2

Example 1 is repeated in all essential details except that the materials used are 1040 parts of 4,4'-diamino diphenyl ether, 1562 parts of 3,4-dicarboxy-1,2,3,4-tetrahydro-1-naphthalene succinic dianhydride and 1410 parts of acetophenone.

Example 3

Example 1 is repeated in all essential details except that in the place of the 4,4'-diamino diphenyl methane there is used 1123 parts of 4,4'-diamino diphenyl sulfide.

Example 4

Example 1 is repeated in all essential details except in the place of the TDA there was substituted in part 550 parts of cyclopentane dianhydride and 781 parts of TDA.

Example 5

Example 4 is repeated in all essential details except that in the place of the acetophenone there is substituted 1410 parts of cyclohexanone. The maximum temperature achieved was about 155° C.

Example 6

Example 4 is repeated in all essential details except that in the place of the acetophenone there was substituted 1410 parts of isophorone and the maximum temperature was 165° C.

Example 7

Example 4 is repeated in all essential details except that in the place of the acetophenone there was substituted 1410 parts of propiophenone.

Example 8

Example 4 is repeated in all essential details except that in the place of the acetophenone there was substituted 1410 parts of benzophenone.

Example 9

Example 1 is repeated in all essential details except in the place of the TDA there was substituted 840 parts of 3,4,3',4'-benzophenone tetracarboxylic acid dianhydride and 780 parts of TDA.

Example 10

Example 9 is repeated in all essentiall details except that in the place of the acetophenone there was substituted 1410 parts of propiophenone.

Example 11

Example 1 is repeated in all essential details except that the ingredients charged to the Sigma mixer are 840 parts of benzophenone dianhydride, 780 parts of TDA, 1040 parts of 4,4'-diamino diphenyl ether and 1410 parts of cyclohexanone and the maximum temperature achieved was about 155° C.

Example 12

Example 1 is repeated in all essential details except that in the place of the 1562 parts of the TDA there was substituted 1633 parts of a 50/50 mixture of 3,4-dicarboxy-1,2,3,4-tetrahydro-6 (and 7) methyl-1-naphthalene succinic dianhydrides.

I claim:

1. A process for preparing a polyimide comprising reacting a 3,4 - dicarboxy-1,2,3,4-tetrahydro-1-naphthalene succinic dianhydride with a diprimary diamine in the presence of a solvent selected from the group consisting of acetophenone, cyclohexanone, isopharone, propiophenone and benzophenone until substantially all of the theoretical water of imidization has been removed, wherein the total number of moles of dianhydride reactant is substantially equal to the total number of moles of diprimary diamine.

2. The process according to claim 1 in which said solvent is separated from the polyimide produced after the water of imidization has been removed.

3. The process according to claim 1 in which the solvent is acetophenone.

4. The process according to claim 1 in which the solvent is cyclohexanone.

5. The process according to claim 1 in which the solvent is isopharone.

6. The process according to claim 1 in which the solvent is propiophenone.

7. The process according to claim 1 in which the solvent is benzophenone.

References Cited

UNITED STATES PATENTS 3,179,634   4/1965   Edwards _____ 260—78

FOREIGN PATENTS 1,035,428   7/1966   Great Britain.

WILLIAM H. SHORT, Primary Examiner

HOWARD SCHAIN, Assistant Examiner

U.S. Cl. X.R.

117—124, 128.4, 148; 260—33.2